United States Patent
Ohba et al.

(10) Patent No.: US 10,169,237 B2
(45) Date of Patent: *Jan. 1, 2019

(54) IDENTIFICATION OF A COMPUTING DEVICE ACCESSING A SHARED MEMORY

(71) Applicant: International Business Machines Corporation, Armonk, NY (US)

(72) Inventors: Nobuyuki Ohba, Sendai (JP); Atsuya Okazaki, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 22 days.

This patent is subject to a terminal disclaimer.

(21) Appl. No.: 15/704,498

(22) Filed: Sep. 14, 2017

(65) Prior Publication Data

US 2018/0004665 A1    Jan. 4, 2018

Related U.S. Application Data

(63) Continuation of application No. 14/746,886, filed on Jun. 23, 2015, now Pat. No. 9,928,175, which is a (Continued)

(30) Foreign Application Priority Data

May 17, 2014    (JP) .................. 2014-102910

(51) Int. Cl.
*G06F 12/08* (2016.01)
*G06F 12/0831* (2016.01)
(Continued)

(52) U.S. Cl.
CPC ........ *G06F 12/0831* (2013.01); *G06F 12/084* (2013.01); *G06F 12/0815* (2013.01);
(Continued)

(58) Field of Classification Search
CPC ............. G06F 12/0831; G06F 12/0815; G06F 12/084; G06F 12/842; G06F 2212/1056;
(Continued)

(56) References Cited

U.S. PATENT DOCUMENTS

| 5,241,664 A | 8/1993 | Ohba et al. |
| 5,265,232 A | 11/1993 | Gannon et al. |

(Continued)

FOREIGN PATENT DOCUMENTS

| JP | 09311820 A | 12/1997 |
| JP | 39311820 A | 12/1997 |

(Continued)

OTHER PUBLICATIONS

Decision to Grant a Patent, Application No. 2014-102910, dated Mar. 30, 2016. dated Apr. 26, 2016. 6 pages.

(Continued)

*Primary Examiner* — Ann J Lo
*Assistant Examiner* — Masud K Khan
(74) *Attorney, Agent, or Firm* — Stosch Sabo

(57) ABSTRACT

A method for identifying, in a system including two or more computing devices that are able to communicate with each other, with each computing device having with a cache and connected to a corresponding memory, a computing device accessing one of the memories, includes monitoring memory access to any of the memories; monitoring cache coherency commands between computing devices; and identifying the computing device accessing one of the memories by using information related to the memory access and cache coherency commands.

1 Claim, 12 Drawing Sheets

Related U.S. Application Data continuation of application No. 14/700,808, filed on Apr. 30, 2015, now Pat. No. 9,940,237.

(51) Int. Cl.
*G06F 12/0815* (2016.01)
*G06F 12/084* (2016.01)
*G06F 12/0842* (2016.01)

(52) U.S. Cl.
CPC .. *G06F 12/0842* (2013.01); *G06F 2212/1056* (2013.01); *G06F 2212/2542* (2013.01); *G06F 2212/306* (2013.01); *G06F 2212/62* (2013.01); *G06F 2212/621* (2013.01)

(58) Field of Classification Search
CPC ....... G06F 2212/2542; G06F 2212/306; G06F 2212/621; G06F 2212/62
USPC ....... 711/141, 146, 150; 710/25, 26; 712/11, 712/14, 26
See application file for complete search history.

(56) References Cited

U.S. PATENT DOCUMENTS

| | | | |
|---|---|---|---|
| 5,890,217 A | 3/1999 | Kabemoto et al. | |
| 6,065,077 A | 5/2000 | Fu | |
| 6,073,225 A | 6/2000 | James et al. | |
| 6,457,100 B1 | 9/2002 | Ignatowski et al. | |
| 6,598,128 B1 | 7/2003 | Yoshioka et al. | |
| 6,631,447 B1 | 10/2003 | Morioka et al. | |
| 6,631,450 B1 | 10/2003 | Arimilli et al. | |
| 6,711,651 B1 | 3/2004 | Moreno et al. | |
| 7,228,389 B2 | 6/2007 | Jones et al. | |
| 7,653,788 B2 | 1/2010 | Cousin et al. | |
| 8,285,927 B2 | 10/2012 | Flynn et al. | |
| 8,375,184 B2 | 2/2013 | Kumar et al. | |
| 9,086,974 B2 | 7/2015 | Busaba et al. | |
| 9,223,677 B2 | 12/2015 | Swaine et al. | |
| 2001/0051977 A1 | 12/2001 | Hagersten | |
| 2002/0007440 A1 | 1/2002 | Hosoya et al. | |
| 2002/0042860 A1 | 4/2002 | Murakami et al. | |
| 2003/0033510 A1 | 2/2003 | Dice | |
| 2003/0163649 A1* | 8/2003 | Kapur | G06F 12/0813 711/146 |
| 2005/0240736 A1 | 10/2005 | Shaw | |
| 2006/0075197 A1 | 4/2006 | Shimada et al. | |
| 2006/0259705 A1 | 11/2006 | Cousin et al. | |
| 2006/0265466 A1 | 11/2006 | Yasui et al. | |
| 2008/0270713 A1 | 10/2008 | Hornung et al. | |
| 2008/0270813 A1 | 10/2008 | Yang et al. | |
| 2009/0089511 A1 | 4/2009 | O'Krafka et al. | |
| 2010/0180085 A1 | 7/2010 | Dave et al. | |
| 2010/0257319 A1 | 10/2010 | Usui | |
| 2011/0004729 A1 | 1/2011 | Akkawi et al. | |
| 2011/0066811 A1 | 3/2011 | Sander et al. | |
| 2011/0153944 A1 | 6/2011 | Kursawe | |
| 2011/0173398 A1* | 7/2011 | Boyle | G06F 12/0862 711/137 |
| 2014/0156951 A1 | 6/2014 | Pierson et al. | |
| 2015/0026410 A1 | 1/2015 | Nguyen et al. | |
| 2015/0331795 A1 | 11/2015 | Ohba et al. | |
| 2015/0331797 A1 | 11/2015 | Ohba et al. | |
| 2016/0232077 A1 | 8/2016 | Hu et al. | |

FOREIGN PATENT DOCUMENTS

| | | |
|---|---|---|
| JP | 2006318412 A | 11/2006 |
| JP | 2008152665 A | 7/2008 |
| JP | 2009032197 A | 2/2009 |
| JP | 2009193604 A | 8/2009 |

OTHER PUBLICATIONS

JP Office Action; Notification of Reasons for Refusal, Application No. 2014-102910, dated Feb. 5, 2016. dated Apr. 29, 2016. 4 pages.
List of IBM Patents or Patent Application Treated as Related, Sep. 13, 2017. 2 pages.
Ohba, et al., "Identification of a Computing Device Accessing a Shared Memory", U.S. Appl. No. 15/704,551, filed Sep. 14, 2017.

* cited by examiner

IDENTIFICATION OF A COMPUTING DEVICE ACCESSING A SHARED MEMORY

BACKGROUND

The present invention relates to a memory access tracing method and, more specifically, to a method for identifying a processor accessing shared memory in a multiprocessor system.

Memory access tracing is one of the methods used to design and tune hardware such as caches, memory controllers and interconnects between CPUs, and one of the methods used to design and tune software such as virtual machines, operating systems and applications. Memory access tracing usually probes signals on the memory bus, and records its command, address, and data.

In a shared-memory multiprocessor such as a non-uniform memory access (NUMA) system, memory access tracing can be performed by monitoring the signals between a CPU and its local memory (DIMM), and recording them.

In order to analyze the behaviors of hardware and software with greater precision, memory access traces should preferably have the information on which CPU performs a particular memory access. For example, in a NUMA system, identification of the CPU generating the access to the local or remote memory is required.

The address and read/write information flows on a memory bus, but the information used to identify which CPU is making the access does not. Therefore, the CPU making an access cannot be identified using conventional memory access tracing. As a result, a probe has to be connected to an interconnect (CI) between CPUs to monitor the flow of read/write packets. However, having to monitor all interconnects between CPUs in order to identify the CPU making the particular memory access requires a significant amount of electronic and mechanical effort. In addition, because local memory accesses do not appear on the interconnects between CPUs, the CPU making the access cannot be identified by simply monitoring the interconnects.

SUMMARY

In one embodiment, a method for identifying, in a system including two or more computing devices that are able to communicate with each other, with each computing device having with a cache and connected to a corresponding memory, a computing device accessing one of the memories, includes monitoring memory access to any of the memories; monitoring cache coherency commands between computing devices; and identifying the computing device accessing one of the memories by using information related to the memory access and cache coherency commands.

In another embodiment, a method for identifying, in a system including two or more computing devices that are able to communicate with each other via an interconnect, with each computing device provided with a cache and connected to the corresponding memory, the computing device accessing a first memory being one of the memories, includes monitoring memory access to the first memory via a memory device connected to the first memory; monitoring cache coherency commands between computing devices via an interconnect between computing device and storing information related to the commands; identifying a command from a history of information related to the commands including a memory address identical to the memory address in memory access to the first memory; and identifying, as the computing device accessing the first memory, the computing device issuing the identified command at the timing closest to the timing of the memory access to the first memory.

In another embodiment, a non-transitory, computer readable storage medium having computer readable instruction stored thereon that, when executed by a computer, implement method for identifying, in a system including two or more computing devices that are able to communicate with each other, with each computing device having with a cache and connected to a corresponding memory, the computing device accessing one of the memories, including monitoring memory access to any of the memories; monitoring cache coherency commands between computing devices; and identifying the computing device accessing one of the memories by using information related to the memory access and cache coherency commands.

DETAILED DESCRIPTION

Embodiments of the present invention provide a method for identifying a computing device that accesses one of the shared memories in a multiprocessor system where two or more computing devices are able to communicate with each other, and each computing device has a cache and corresponding memory.

In particular, embodiments of the present invention provide a method for identifying the computing device accessing one of the memories in a system, where two or more computing devices are able to communicate with each other, and each computing device has a cache and corresponding memory. This method includes monitoring memory access to any of the memories; monitoring cache coherency commands between computing devices; and identifying the computing device accessing one of the memories by using the information on the memory access and the information on the cache coherency commands.

In one aspect, monitoring memory access to any of the memories also includes acquiring information related to memory access via a memory device connected to one of the memories and storing the information.

In one aspect, monitoring cache coherency commands between computing devices also includes monitoring cache coherency commands via an interconnect between computing devices and storing information related to cache coherency commands.

In one aspect, identifying the computing device accessing one of the memories also includes: identifying a cache coherency command from a history of information related to cache coherency commands including a memory address identical to the memory address in information related to memory access; and identifying, as the computing device accessing one of the memories, the computing device issuing identified cache coherency commands at the timing closest to the timing of the memory access.

In one aspect, the information related to memory access includes the access time, the type of command, and the memory address; and the information related to cache coherency commands includes the time at which a command was issued, the type of command, the memory address, and the ID of the computing device issuing the command.

Figure 1:
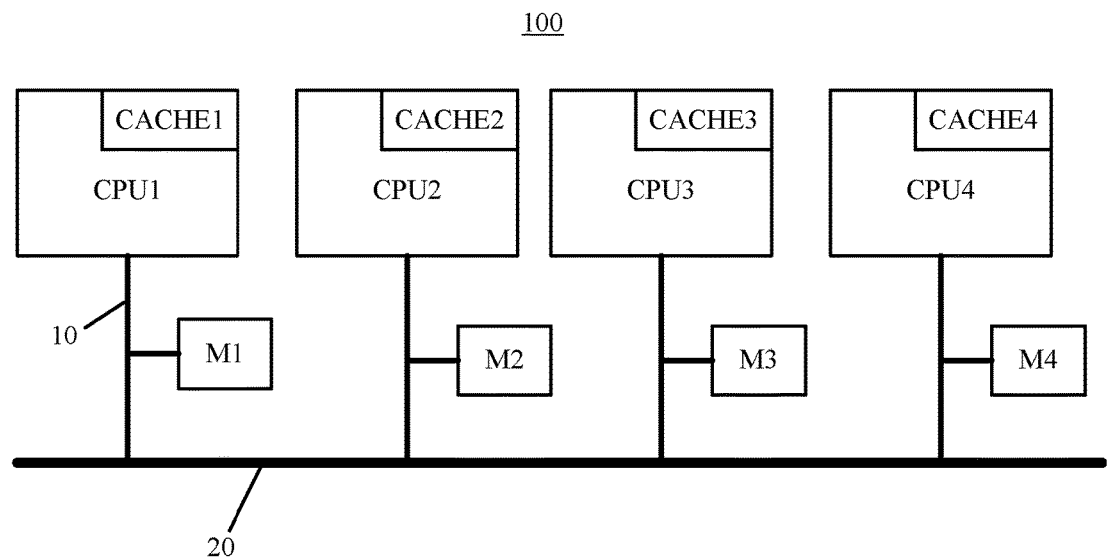
FIG. 1 is a block diagram showing a configuration example of a multiprocessor system executing a method according to an embodiment of the present invention.
Figure 2:
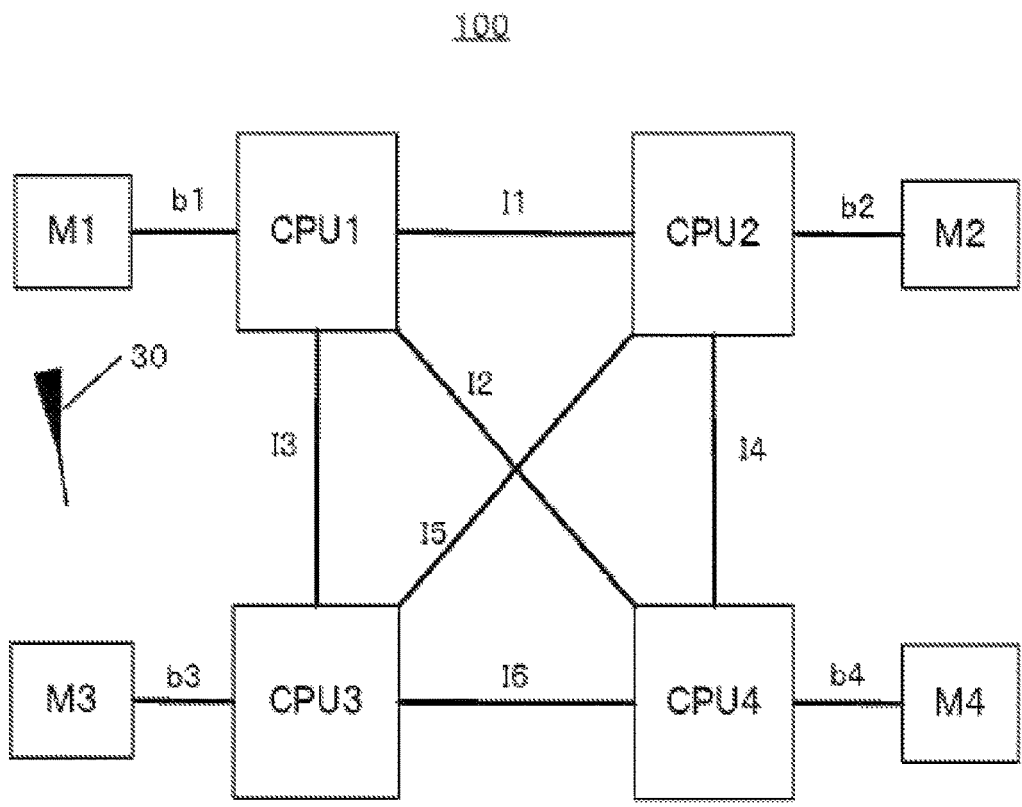
FIG. 2 is a block diagram showing a configuration example of a multiprocessor system executing the method of the present invention.

The following is an explanation of an embodiment of the present invention with reference to the drawings. FIG. 1 and FIG. 2 are diagrams showing configuration examples of multiprocessor systems executing the method of the present invention. FIG. 1 and FIG. 2 are configuration examples of shared-memory multiprocessor systems 100 with non-uniform memory access (NUMA) design. In FIG. 1 and FIG. 2, the examples include four NUMA processors CPU1-4 (referred to below simply as CPUs). However, execution of the present invention is not restricted to these configurations, and can be executed in any microprocessor system with shared memory.

In FIG. 1, CPU1-4 and memory M1-M4 are connected via a memory bus 10 so as to be able to communicate with each other. Each CPU is equipped with a cache such as cache 1-4, and is connected via an interconnect 20 so as to be able to communicate with the others. Each memory M1-M4 is shared by the CPUs as local memory or remote memory. The memories M1-M4 are memory modules (for example, DIMMs) including a plurality of DRAMs. In the example shown in FIG. 1, MM is global memory, which can be accessed equally by all CPUs.

FIG. 2 is a block (image) diagram in which the shared-memory multiprocessor system 100 in FIG. 1 has been re-configured for the explanation of the present invention. In FIG. 2, the interconnects between CPUs are the lines denoted by reference numbers I1-I6, which correspond to the interconnects 20 in FIG. 1. The memory buses are the lines denoted by reference numbers b1-b4. In the method of the present invention, as explained below, a probe demoted by number 30 is used to monitor one or more of the memory buses b1-b2 and one or more of the interconnects I1-I6. More precisely, the monitoring results (information) are used to identify the CPUs accessing (R/W) the shared memories M1-M4.

Figure 3:
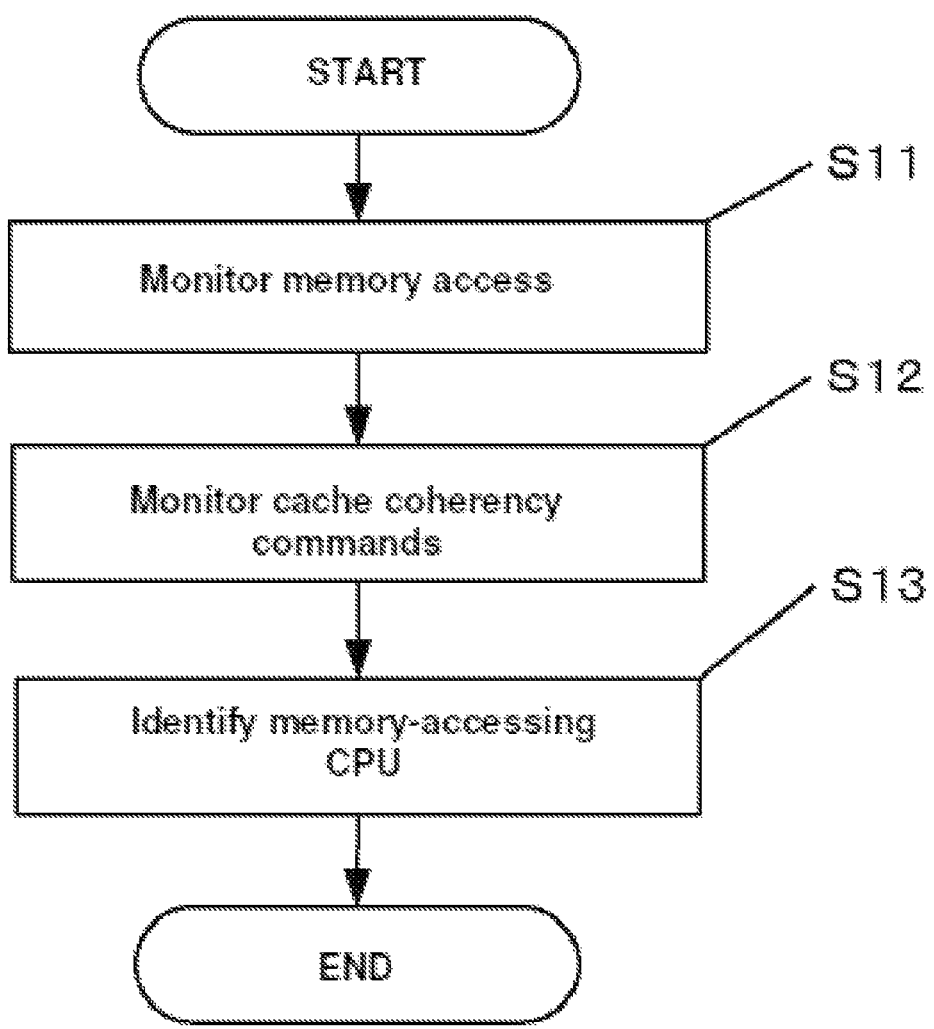
FIG. 3 is a diagram showing the basic processing flow of the method of the present invention.

The following is an explanation of the processing flow of the present invention referring to FIG. 2 and FIG. 3. FIG. 3 is a basic processing flow of the method of the present invention. The method of the present invention can be embodied, for example, by having a computer (server) including the shared-memory multiprocessor system 100 described above call specific software stored in memory (such as an HDD that can be accessed by the computer).

In operation S11 of FIG. 3, memory accesses to any one of the memories M1-M4 are monitored. During the monitoring process, a probe 30 is connected to one or more of the memory buses b1-b4, information related to memory access is acquired from bus signals in operation 1010 of method 1000 of FIG. 10, and the information is stored in specific memory in operation 1020 of FIG. 10 (such as an HDD that can be accessed by the computer). The information related to memory access may include the access time acquired in operation 1110 of method 1100 of FIG. 11, the type of command acquired in operation 1120 of FIG. 11, and the memory address acquired in operation 1130 of FIG. 11.

In operation S12, cache coherency commands between CPUs 1-4 are monitored. During the monitoring process, a probe 30 is connected to one or more of the interconnects I1-I6, information related to cache coherency commands (packet information, protocols) is obtained from interconnect signals in operation 1010 of FIG. 10, and the information is stored in specific memory in operation 1020 of FIG. 10 (such as an HDD that can be accessed by the computer). Information related to these commands may include the time at which a command was issued as acquired in operation 1140 of FIG. 11, the type of command as acquired in operation 1120 of FIG. 11, the memory address as acquired in operation 1130 of FIG. 11, and the ID of the computing device that issued the command.

Figure 12:
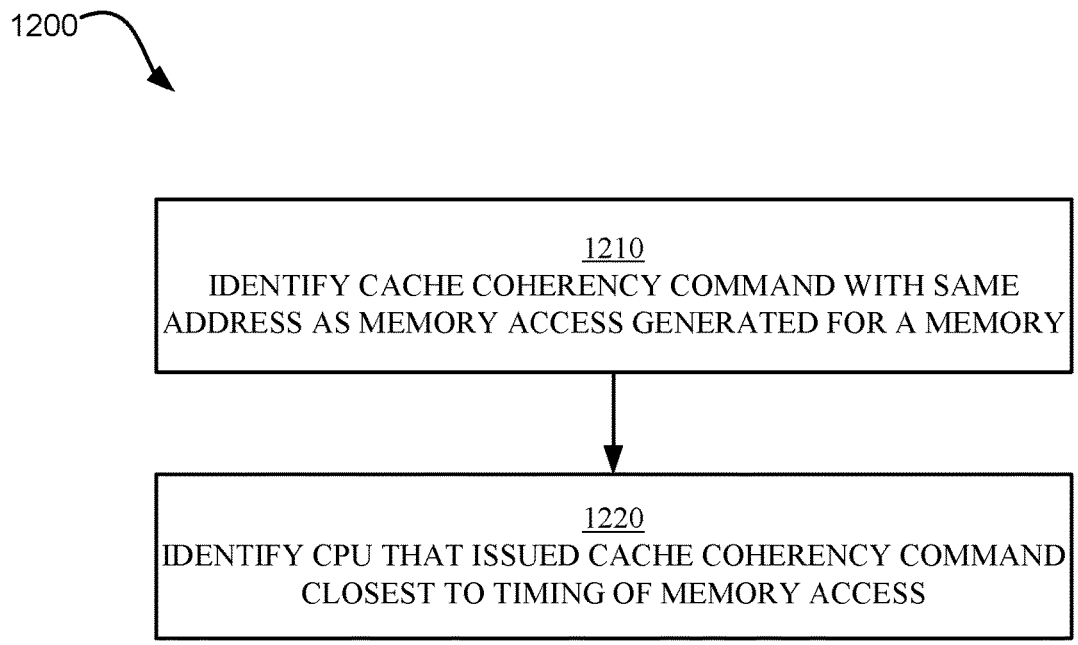
FIG. 12 is a diagram showing the basic processing flow of operation S13 of FIG. 3 according to some embodiments of the present disclosure.

In operation S13, the CPU accessing any one of the memories M1-M4 is identified from the information related to memory access acquired in Step S11, and information related to cache coherency commands obtained in Step S12. The identification process can be executed by a computer performing the following operations as offline analysis using the information stored in the memory:

(i) Identify the cache coherency command that has the same address as the particular memory access generated for one of memories M1-M4 as shown in operation 1210 of method 1200 of FIG. 12.

(ii) The CPU performing the memory access is identified as the CPU issuing the identified cache coherency command at the timing closest to the timing of the memory access (immediately before or immediately after) as shown in operation 1220 of FIG. 12.

The following is a more detailed explanation of the present invention with reference to FIG. 4 through FIG. 9 which are related to the identification of the CPU accessing memory in Step S13. In the following explanation, memory control (cache coherency control) uses MESI protocol to ensure cache coherency in the system 100 in FIG. 2. However, the present invention is not limited to MESI protocol. It can be applied to other broadcast-based cache coherency controls, such as MESIF protocol.

Example 1

Figure 4:
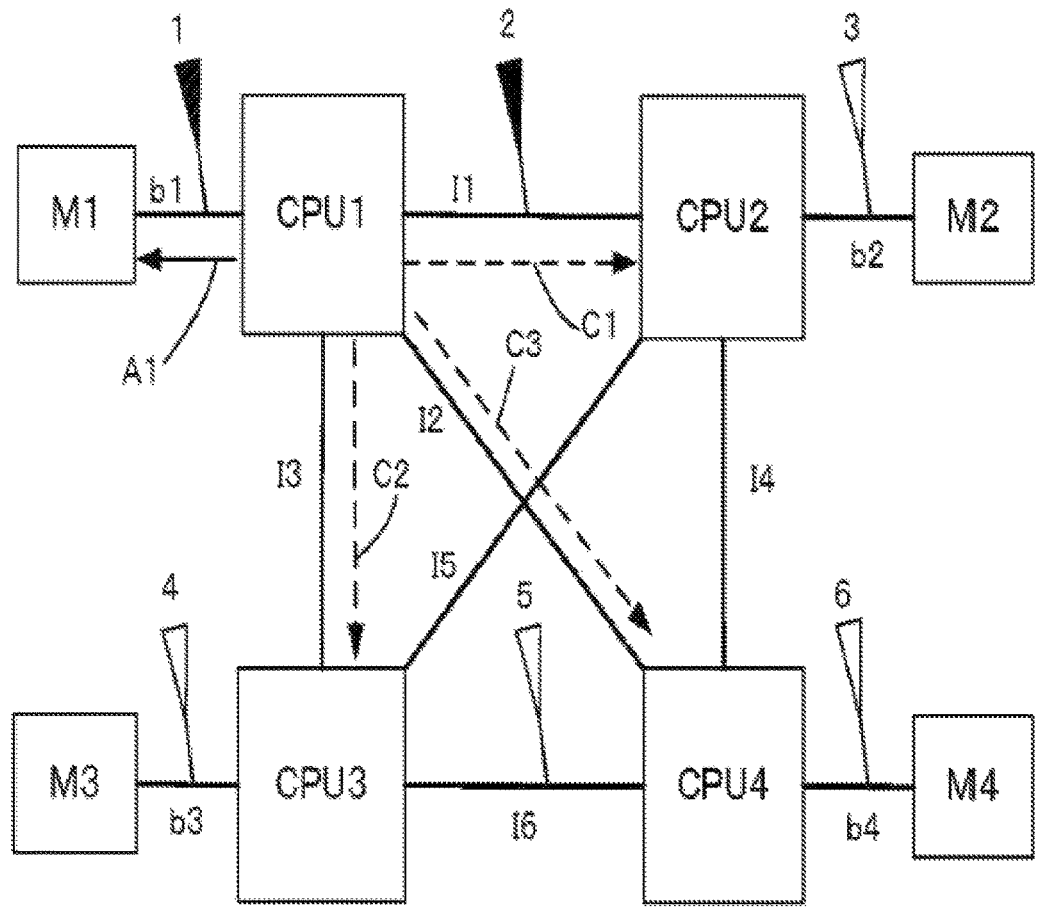
FIG. 4 is a diagram showing the configuration of, and the flow of signals in, an example of the present invention.

This example is explained with reference to FIG. 4. The cache line in CPU1 is assumed to be in the invalid (I) state. CPU1 performs memory access (read) A1 on local memory M1, and sends cache coherency commands C1-C3 to CPUs 2-4 to determine whether or not any of them are sharing the same data. The information for memory access A1 is acquired by probe 1 from bus b1 and stored. As mentioned earlier, the information on memory access A1 includes the access time, the type of command, and the memory address. The content of the information is the same in the other examples explained below. Information on cache coherency command C1 is acquired by probe 2 from interconnect I1 and stored. As mentioned above, the information on cache coherency command C1 includes the time at which a command was issued, the type of command, the memory address, and the ID of the computing device issuing the command. The content of the information is the same in the other examples explained below.

Figure 10:
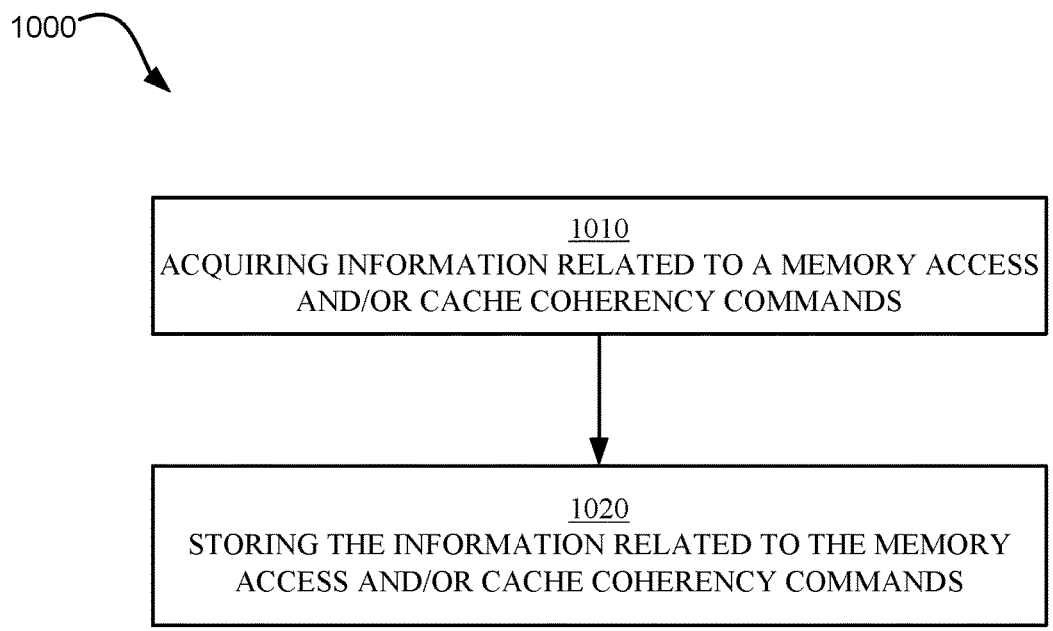
FIG. 10 is a diagram showing the basic processing flow of operations S11 and S12 of FIG. 3 according to some embodiments of the present disclosure.
Figure 11:
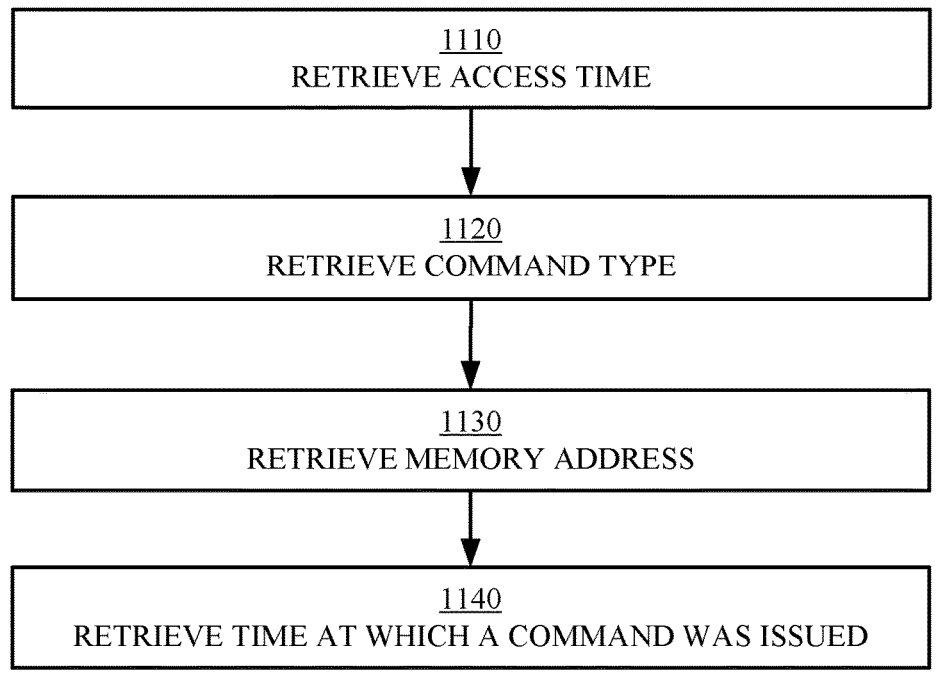
FIG. 11 is a diagram showing the basic processing flow of operation 1010 of FIG. 10 according to some embodiments of the present disclosure.

The history of the stored information from operation 1020 of FIG. 10 is used to identify CPU1 as the CPU performing memory access M1, because CPU1 issued cache coherency command C1 at the timing closest to the timing of memory access A1 (immediately before or immediately after). In other words, CPU1 is identified as the CPU that accessed (read) memory M1 because it generated memory access A1 at the timing closest to the timing for the issuing of cache coherency command C1 (immediately before or immediately after).

Example 2

Figure 5:
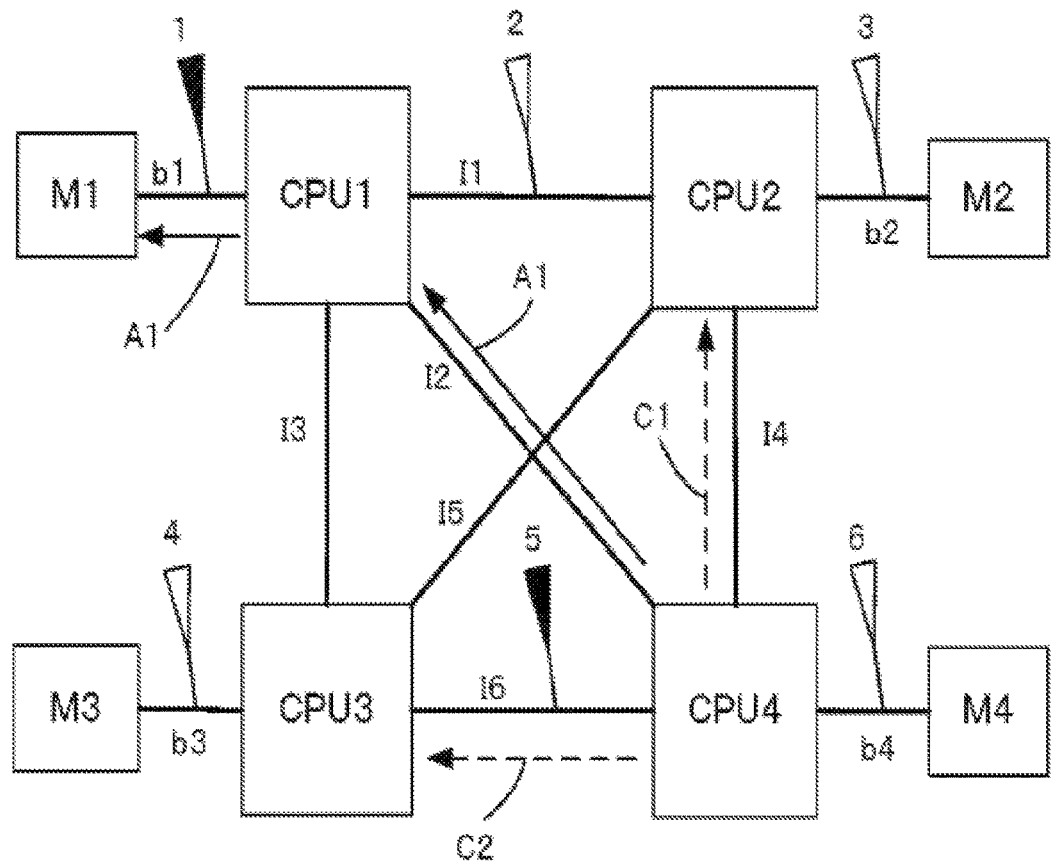
FIG. 5 is a diagram showing the configuration of, and the flow of signals in, an example of the present invention.

This example is explained with reference to FIG. 5. Unlike the situation shown in FIG. 4, the cache line in CPU4 is in the invalid (I) state. CPU4 performs memory access (read) A1 on the local memory M1 for CPU1, which is remote memory for the processing unit, and sends cache coherency commands C1-C2 to CPUs 2-3 to determine whether or not any of them are sharing the same data. Here, the information for memory access A1 is acquired by probe 1 from bus b1 and stored. Information on cache coherency command C2 is acquired by probe 5 from interconnect I6 and stored.

The history of the stored information is used to identify CPU 4 as the CPU performing memory access A1, because CPU4 issued cache coherency command C2 at the timing closest to the timing of memory access A1 (immediately before or immediately after). In other words, CPU4 is identified as the CPU that accessed (read) memory M1 because it generated memory access A1 at the timing closest to the timing for the issuing of cache coherency command C2 (immediately before or immediately after).

Example 3

This example is explained with reference to FIG. 4. The three cache lines in CPU1, 3 and 4 are in the shared (S) state. CPU1 performs memory access (write) A1 on the local memory M1, and sends cache coherency commands C1-C3 to CPUs 2-4 to notify them of the invalidation of the same data of the write address. Here, the information for memory access A1 is acquired by probe 1 from bus b1 and stored. Information on cache coherency command C1 is acquired by probe 2 from interconnect I1 and stored.

The history of the stored information is used to identify CPU1 as the CPU performing memory access A1, because CPU1 issued cache coherency command C1 at the timing closest to the timing of memory access A1 (immediately before or immediately after). In other words, CPU1 is identified as the CPU that accessed (write) memory M1 because it generated memory access A1 at the timing closest to the timing for the issuing of cache coherency command C1 (immediately before or immediately after).

Example 4

This example is explained with reference to FIG. 5. The two cache lines in CPU2, and 4 are in the shared (S) state. CPU4 performs memory access (write) A1 on the local memory M1 for CPU1, which is remote memory for the processing unit, and sends cache coherency commands C1-C2 to CPUs 2-3 to notify them of the invalidation of the same data of the write address. Here, the information for memory access A1 is acquired by probe 1 from bus b1 and stored. Information on cache coherency command C2 is acquired by probe 5 from interconnect I6 and stored.

The history of the stored information is used to identify CPU4 as the CPU performing memory access A1, because CPU4 issued cache coherency command C2 at the timing closest to the timing of memory access A1 (immediately before or immediately after). In other words, CPU4 is identified as the CPU that accessed (write) memory M1 because it generated memory access A1 at the timing closest to the timing for the issuing of cache coherency command C2 (immediately before or immediately after).

Example 5

Figure 6:
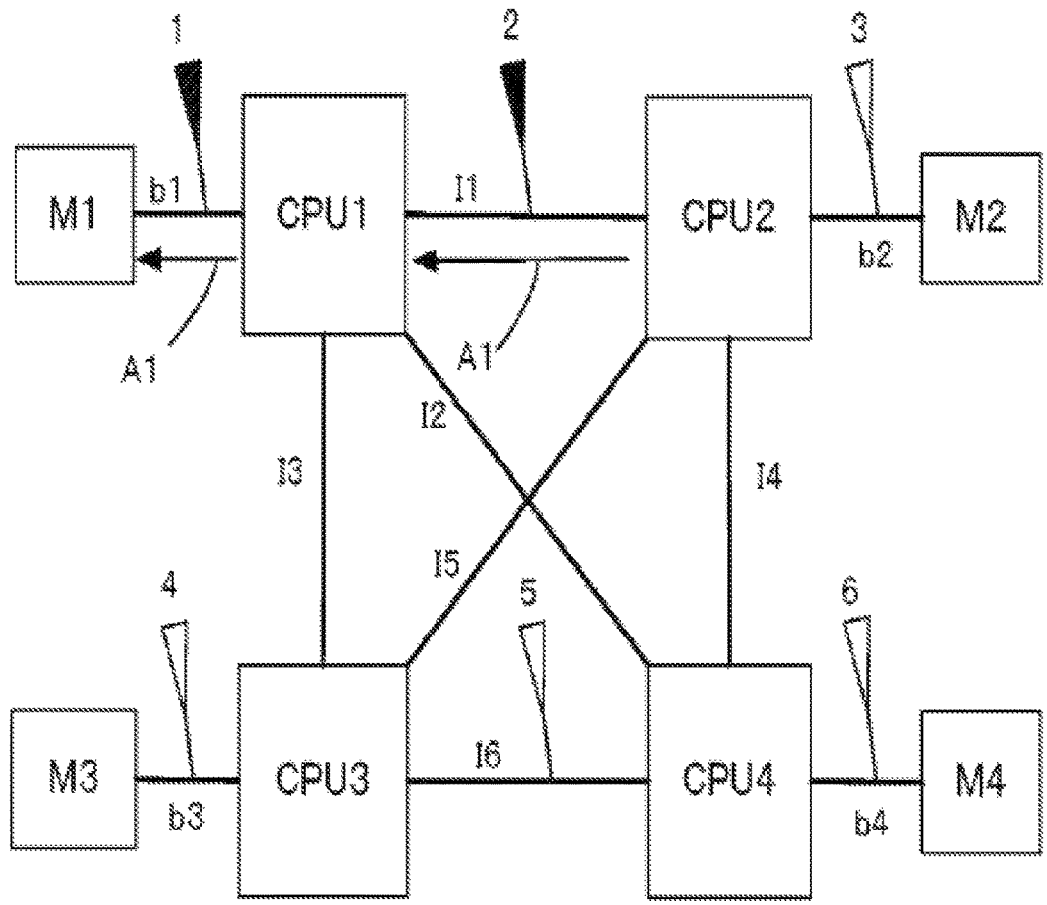
FIG. 6 is a diagram showing the configuration of, and the flow of signals in, an example of the present invention.

This example is explained with reference to FIG. 6. The cache line in CPU2 is in the modified (M) state, and this is a case in which the cache line is cast out. CPU2 performs memory access (write) A1 on the local memory M1 for CPU1, which is remote memory for the processing unit. Here, the information for memory access A1 is acquired by probes 1 and 2 from bus b1 and interconnect I1, and stored. Note that because the cache line in the M state was cast out, CPU2 does not send a snoop request to CPU3 and CPU4.

The history of the stored information is used to identify CPU2 as the CPU performing memory access A1, because CPU2 accessed (wrote to) the same address as the address in the information on the memory access A1 made to memory M1 most recently (last).

Example 6

Figure 7:
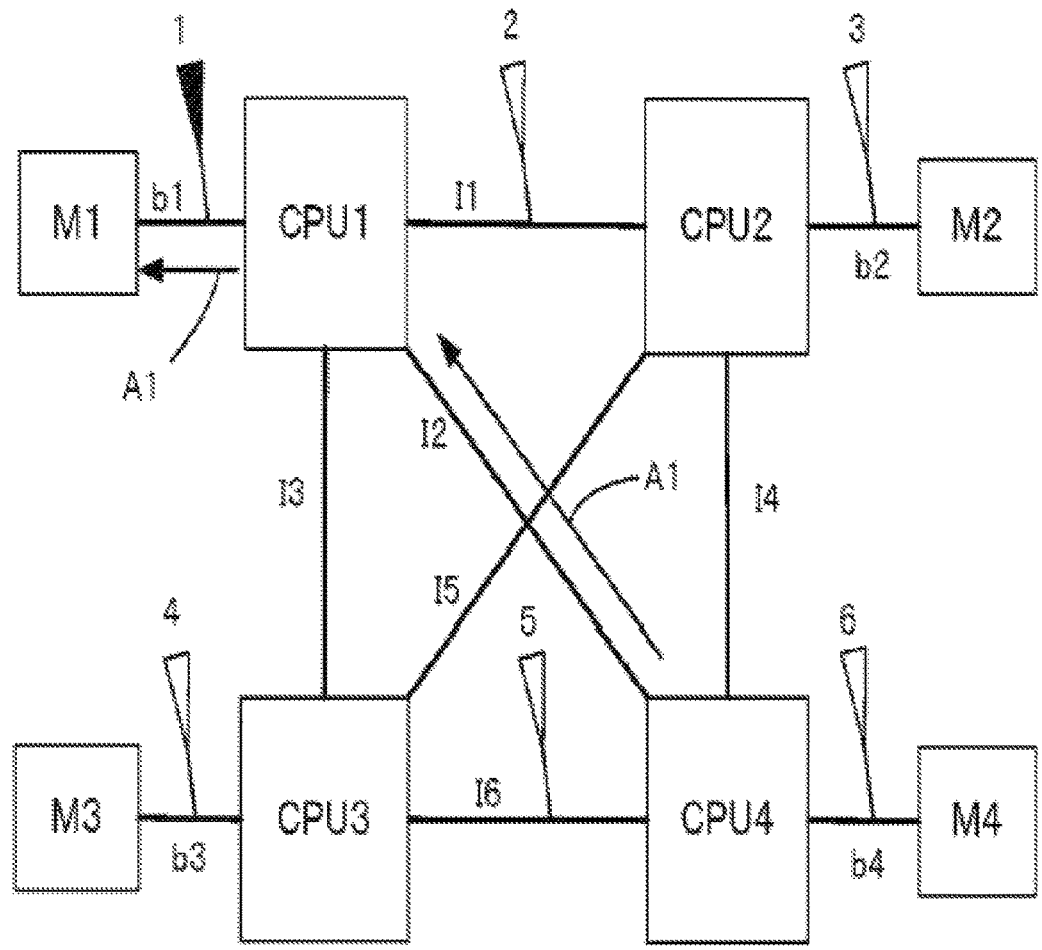
FIG. 7 is a diagram showing the configuration of, and the flow of signals in, an example of the present invention.

This example is explained with reference to FIG. 7. After the situation in Example 2 (FIG. 5) has passed, the cache line in CPU4 enters the modified (M) state. CPU4 performs memory access (write) A1 on the local memory M1 for CPU1, which is remote memory for the processing unit. Because the cache line was in the M state and was cast out, the CPU4 does not send cache coherency commands C1, C2 to the other CPUs. Information on memory access A1 is acquired from bus b1 by probe 1 and stored.

The history of the stored information is used to identify CPU4 as the CPU performing memory access A1, because CPU4 accessed (wrote to) the same address as the address in the information on the memory access A1 made to memory M1 most recently (last).

Example 7

Figure 8:
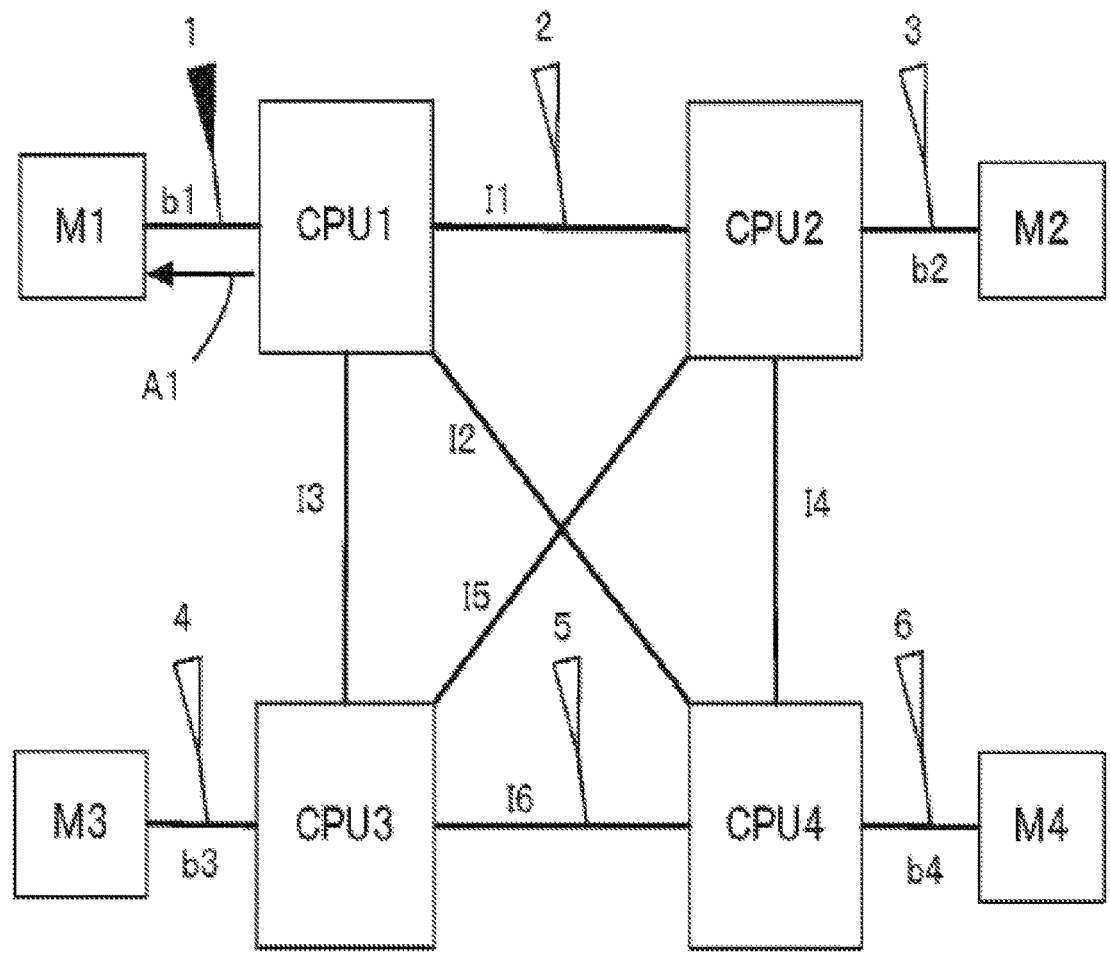
FIG. 8 is a diagram showing the configuration of, and the flow of signals in, an example of the present invention.

This example is explained with reference to FIG. 8. After the situation in Example 1 (FIG. 4) has passed, the cache line in CPU1 is in the modified (M) state. Because the cache line is in the M state and needs to be cast out, the CPU1 performs memory access (write) A1 on the local memory M1. At this time, the CPU1 does not send cache coherency commands C1, C2 to the other CPUs. Information on memory access A1 is acquired from bus b1 by probe 1 and stored.

The history of the stored information is used to identify CPU1 as the CPU performing access to memory M1 (read or write), because CPU1 accessed (read from or wrote to) the same address as the address in the information on the memory access A1 made to memory M1 most recently (last).

Example 8

Figure 9:
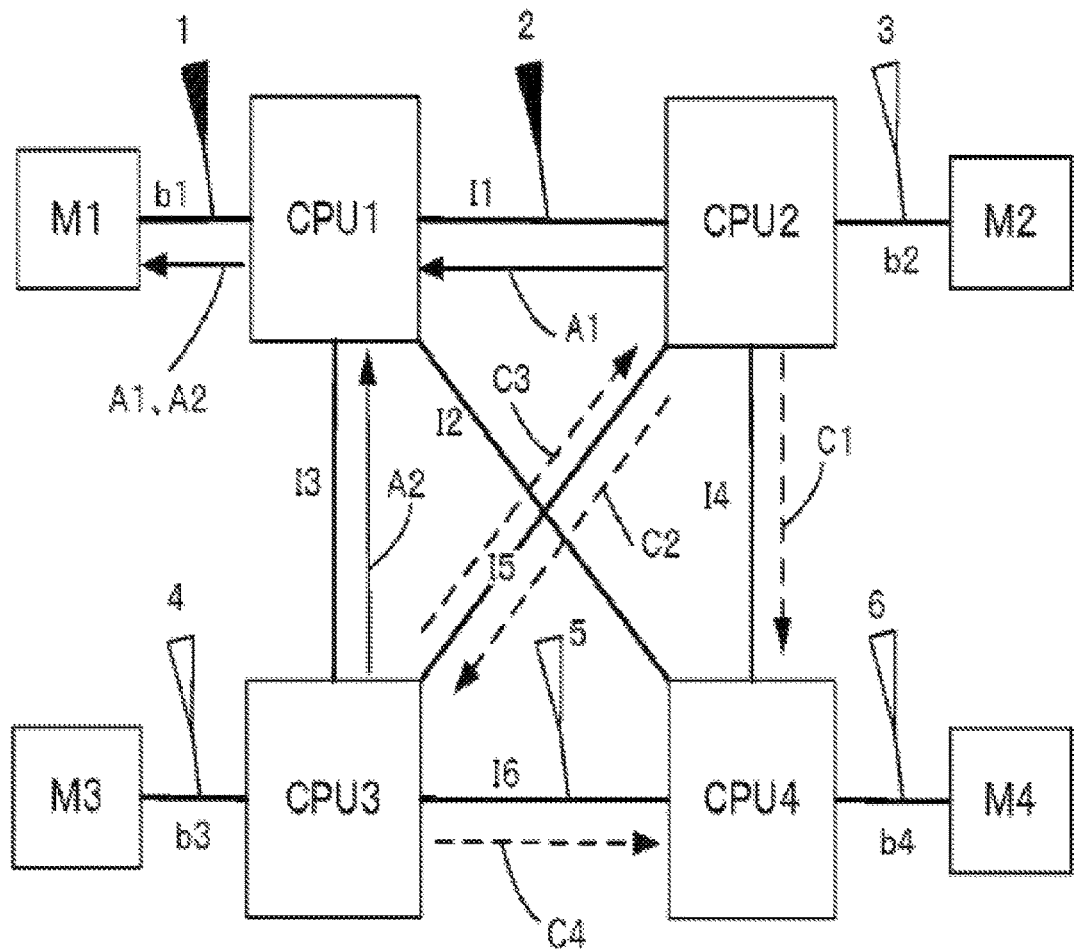
FIG. 9 is a diagram showing the configuration of, and the flow of signals in, an example of the present invention.

This example is explained with reference to FIG. 9. In the final example explained here, there is a conflict between two memory accesses. CPU2 and CPU3 performed memory accesses (read) A1, A2 on the local memory M1 of CPU1 which is remote memory for both processing units. Information on the memory accesses A1, A2 is acquired from bus b1 by probe 1 and stored.

Note that it cannot be strictly determined which of CPU2 or CPU3 initiates memory access A1 or A2 on b1 based on the history of stored information as the hardware logic of the internal cache/memory of CPU1 is not monitored. In other words, it only identifies CPU2 and CPU3 as the CPUs performing memory accesses A1 and A2, but cannot identify which of CPU2 or CPU3 drives A1 on b1. It cannot identify which of CPU2 or CPU3 drives A2 on b1.

Embodiments of the present invention were described above with reference to the drawings. However, the present invention is by no means restricted to the embodiments described above. Various improvements, modifications and changes are possible without departing from the spirit and scope of the present invention.

REFERENCE SIGNS LIST

10: Memory
20: Interconnect
30: Probe
100: Shared memory multiprocessor system

The invention claimed is:

1. A method for identifying, in a system including two or more computing devices that are able to communicate with each other, with each computing device having a cache and connected to a corresponding memory, the computing device accessing one of the memories, the method comprising:
    monitoring memory access to any of the memories, wherein monitoring memory access comprises identifying respective computing devices that access respective memories, wherein monitoring memory access to any of the memories further comprises:
        collecting an access time, a type of command, and a first memory address from a first memory read access to a first memory based on information acquired from a first probe attached to a first bus connecting the first memory to a first computing device, wherein the first memory is remote from the first computing device, and wherein a cache line in the first computing device is in an invalid state;
        collecting a third access time, a third type of command, and a third memory address from a first memory write access to the first memory based on information acquired from the first probe, wherein the cache line in the first computing device enters a modified state;
    monitoring cache coherency commands between computing devices, wherein monitoring cache coherency commands further comprises:
        monitoring a first cache coherency command sent from the first computing device to at least a second computing device at a first cache coherency time based on information acquired from a second probe attached to a second interconnect connecting the first computing device and the second computing device, wherein the second probe collects the cache coherency time, a type of command, a second memory address, and an identification of the computing device issuing the first cache coherency command; and
    identifying the computing device accessing one of the memories by using information related to the memory access and cache coherency commands, wherein identifying the computing device further comprises:
        identifying the first computing device as the device that accessed the first memory based on the first memory address being equivalent to the second memory address, and further based on a difference between the access time and the first cache coherency time being smaller than a difference between the access time and any other cache coherency time;
        wherein the first computing device is identified as the device performing the first memory write access based on the third memory address being identical to the first memory address and further based on the first computing device performing the first memory read access to the first memory;
    wherein the system is configured in a non-uniform memory access (NUMA) design, wherein each memory comprises at least one dual in-line memory module (DIMM);
    wherein the access time, the type of command, the first memory address, the cache coherency time, the second memory address, and the identification of the computing device issuing the first cache coherency command are stored in a hard disk drive (HDD) accessible by the system; and
    wherein the system utilizes a modified, exclusive, shared, invalid (MESI) cache coherence protocol.

* * * * *